US012175434B2

(12) United States Patent
Tenneti et al.

(10) Patent No.: US 12,175,434 B2
(45) Date of Patent: Dec. 24, 2024

(54) PROGNOSTICS AND HEALTH MANAGEMENT SERVICE

(71) Applicant: Amazon Technologies, Inc., Seattle, WA (US)

(72) Inventors: Srikanth Venkata Tenneti, Sunnyvale, CA (US); Arvindh Krishnaswamy, Palo Alto, CA (US); Karim Helwani, Mountain View, CA (US); Mehmet Umut Isik, Menlo Park, CA (US); Ritwik Giri, Sunnyvale, CA (US); Fangzhou Cheng, Mountain View, CA (US); Aparna Pandey, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 194 days.

(21) Appl. No.: 17/039,649

(22) Filed: Sep. 30, 2020

(65) Prior Publication Data

US 2022/0101270 A1    Mar. 31, 2022

(51) Int. Cl.
*G06Q 10/20*    (2023.01)
*G06F 16/21*    (2019.01)
*G06F 16/906*    (2019.01)

(52) U.S. Cl.
CPC .......... *G06Q 10/20* (2013.01); *G06F 16/219* (2019.01); *G06F 16/906* (2019.01)

(58) Field of Classification Search
CPC ...... G06Q 10/20; G06F 16/906; G06F 16/219
(Continued)

(56) References Cited

U.S. PATENT DOCUMENTS 6,581,058 B1 * 6/2003 Fayyad .................. G06F 16/30
707/E17.058
8,094,948 B2 * 1/2012 Jain ........................ G06V 20/10
382/224
(Continued)

FOREIGN PATENT DOCUMENTS

CN    111163065 A  *  5/2020

OTHER PUBLICATIONS

Zhong et al., "Manifold regularized cross-modal embedding for zero-shot learning", Information Sciences, vol. 378, 2017, pp. 48-58.*

(Continued)

*Primary Examiner* — Giovanna B Colan
(74) *Attorney, Agent, or Firm* — Nicholson De Vos Webster & Elliott LLP

(57) ABSTRACT

Systems, methods, and apparatuses for detecting anomalies using clusters are described. In some examples, a method includes receiving a request to perform anomaly detection using a plurality of clusters; receiving a data point; determining when the received data point is a part of one of the plurality of clusters utilizing a distance to centers of the one or more clusters, wherein: when the received data point is determined to belong to a normal cluster, assigning the received data point to the determined cluster, updating the cluster, and updating a history for the cluster, when the received data point is determined to belong to an anomalous cluster, raising an anomaly, updating the cluster, and updating a history for the cluster, and when the received data point is determined to not belong to any cluster, raising an anomaly.

20 Claims, 14 Drawing Sheets

(58) Field of Classification Search
USPC .......................................................... 707/737
See application file for complete search history.

(56) References Cited

U.S. PATENT DOCUMENTS

| | | | |
|---|---|---|---|
| 11,038,588 B1 | 6/2021 | Lee et al. | |
| 11,430,065 B2* | 8/2022 | Singh | G06F 18/24133 |
| 11,829,148 B1 | 11/2023 | Ebrahimi et al. | |
| 2006/0285755 A1* | 12/2006 | Hager | G06V 20/653 |
| | | | 382/224 |
| 2008/0294684 A1* | 11/2008 | Chi | G06F 16/355 |
| | | | 707/E17.046 |
| 2010/0161609 A1* | 6/2010 | Fogel | G06F 18/2433 |
| | | | 707/E17.089 |
| 2013/0262465 A1* | 10/2013 | Galle | G06F 16/00 |
| | | | 707/E17.089 |
| 2015/0055858 A1 | 2/2015 | Abdallah et al. | |
| 2017/0011298 A1 | 1/2017 | Pal et al. | |
| 2017/0124478 A1* | 5/2017 | Baradaran | H04L 41/16 |
| 2017/0330109 A1 | 11/2017 | Maughan et al. | |
| 2017/0364817 A1 | 12/2017 | Raykov et al. | |
| 2018/0089042 A1 | 3/2018 | Demetriou et al. | |
| 2018/0096028 A1 | 4/2018 | Masekera et al. | |
| 2018/0316707 A1* | 11/2018 | Dodson | H04L 43/16 |
| 2018/0322363 A1* | 11/2018 | Urmanov | G06F 18/23213 |
| 2018/0341876 A1 | 11/2018 | Ghosh et al. | |
| 2019/0026681 A1* | 1/2019 | Polli | G06Q 10/06398 |
| 2019/0146982 A1* | 5/2019 | Soceanu | G06F 16/285 |
| | | | 707/737 |
| 2019/0188212 A1* | 6/2019 | Miller | H04L 63/145 |
| 2019/0370394 A1 | 12/2019 | Li et al. | |
| 2020/0057689 A1 | 2/2020 | Farahat et al. | |
| 2020/0184278 A1* | 6/2020 | Zadeh | G06N 3/044 |
| 2020/0210538 A1 | 7/2020 | Wang et al. | |
| 2020/0250009 A1 | 8/2020 | Jaeger et al. | |
| 2020/0311616 A1 | 10/2020 | Rajkumar et al. | |
| 2020/0344252 A1* | 10/2020 | Menon | G06F 11/3006 |
| 2020/0382536 A1* | 12/2020 | Dherange | H04L 63/1425 |
| 2021/0097425 A1 | 4/2021 | Yang et al. | |
| 2021/0286780 A1* | 9/2021 | Harale | G06N 5/04 |
| 2022/0156595 A1 | 5/2022 | Kadayam et al. | |

OTHER PUBLICATIONS

International Search Report and Written Opinion, PCT App. No. PCT/US21/52440, Feb. 18, 2022, 15 pages.
Final Office Action, U.S. Appl. No. 17/039,708, Apr. 8, 2024, 29 pages.
Non-Final Office Action, U.S. Appl. No. 17/039,687, Mar. 8, 2024, 63 pages.
Summons to Attend Oral Proceedings, EP App. No. 21795198.7, Mar. 13, 2024, 8 pages.
Non-Final Office Action, U.S. Appl. No. 17/039,708, Aug. 17, 2023, 23 pages.
Office Action, EP App. No. 21795198.7, Oct. 5, 2023, 7 pages.
Non-Final Office Action, U.S. Appl. No. 17/039,609, Feb. 6, 2024, 57 pages.
Xie, Huang, and Tuomas Virtanen. "Zero-shot audio classification based on class label embeddings." 2019 IEEE Workshop on Applications of Signal Processing to Audio and Acoustics (WASPAA). IEEE, 2019. (Year: 2019).

* cited by examiner (A)

(B)

(C)

(D)

PROGNOSTICS AND HEALTH MANAGEMENT SERVICE

BACKGROUND

With the advent of new technologies, in factories and plants the industrial systems/machines that are currently operating have become significantly complex. And with time, due to normal aging processes or due to abrupt changes in operational conditions these complex machines are vulnerable to failure. Unexpected, or sooner-than-expected, machine failures can have severe financial effects, hence in recent times the need of an efficient prognostics and health management systems has skyrocketed. By employing an efficient prognostics and health monitoring (PHM) system, businesses can do maintenance proactively based on the system health indicator, resulting in avoiding any major down time of these complex machines.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for management of devices using a provider network. In particular, several different aspects of one or more prognostics and/or device health services are detailed.

Figure 1:
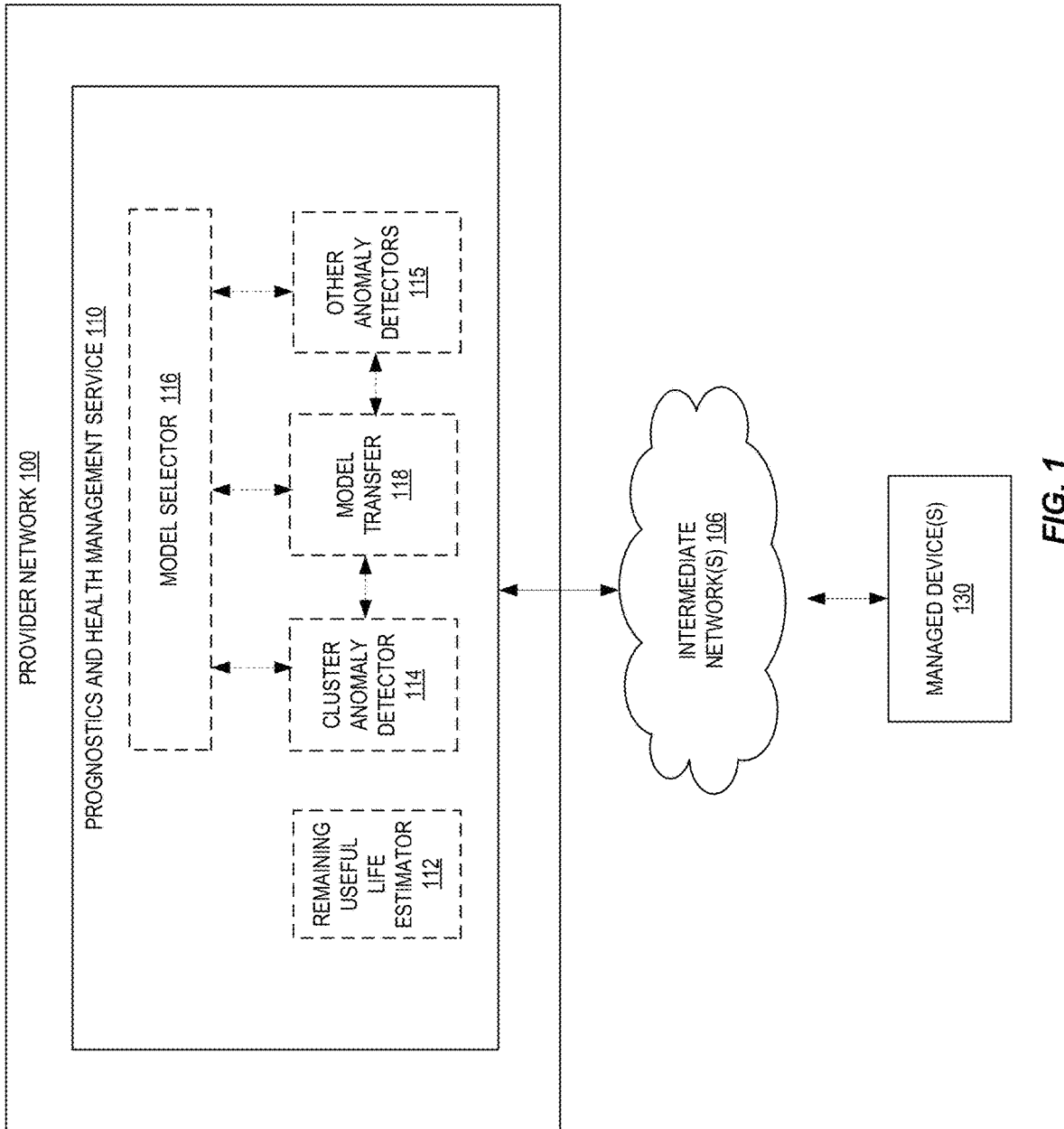
FIG. 1 illustrates embodiments which include a prognostics and health management service.

FIG. 1 illustrates embodiments which include a prognostics and health management service. The prognostics and health management service 110 of a provider network 100 provides the ability to help manage managed device(s) 130 by performing one or more of: estimating the remaining useful life of a component before maintenance is required using remaining useful life estimator 112, generating labeled data and perform anomaly detection using clusters via a cluster anomaly detector 114, transferring knowledge from one model to another model using model transfer 118, and select a model based on a weighted harmonic mean using model selector 116. Each of these aspects (e.g., modules) of the service will individually be discussed below. Note that while these aspects are shown as separate components, they can be combined. For example, the model selector 116 may be implemented as a part of the remaining useful life estimator 112. Additionally, in some embodiments, these aspects are themselves individual or combined services (for example, a remaining useful life estimator service).

As shown, the different aspects (services, modules, etc.) may interact with each other in some embodiments. For example, the model transfer 118 may be used to generate one or more models from which the model selector 116 selects (e.g., models of the cluster anomaly detector 114 or other anomaly detectors 115 that are not discussed in detail).

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

One aspect of device management that is often desired is an estimation of remaining useful life (RUL). As the prediction of RUL is essentially prediction of the future behavior of a complex engineering machine, it comes with several sources of uncertainty. These uncertainties make it challenging to make predictions of RUL with complete precision. Hence it is more meaningful to make predictions of RUL with some confidence interval or uncertainty measure.

Figure 2:
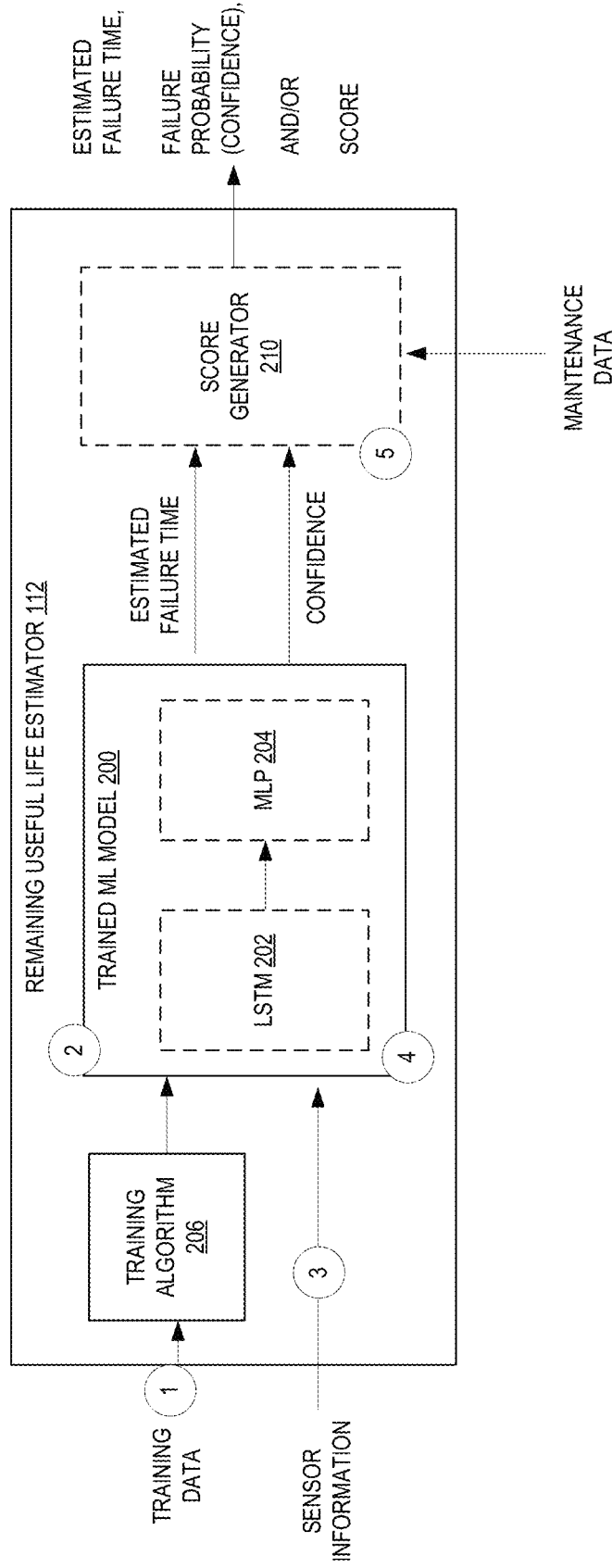
FIG. 2 illustrates embodiments of a remaining useful life estimator.

FIG. 2 illustrates embodiments of the remaining useful life estimator 112. As an exemplary use case, consider a machine monitored by a single sensor. After installation, the machine breaks after 100 days. For the first 90 days, the sensor reading is 0; then, in the last 10 days, the reading gradually increases to 1, at which point the machine fails. The remaining useful life estimator 112 can predict the remaining useful life of the machine given only the sensor reading.

This module takes in provided training data that shows "normal" usage of a managed machine and when the managed machine experiences a need for maintenance. For example, the training data may include labeled data from one or more sensors of the managed machine and timing information that corresponds to the labeled data indicating a maintenance need.

In some embodiments, a training algorithm 206 is applied to a machine learning (ML) algorithm or model to generate a trained ML model 200 which operates on the sensor information. In some embodiments, a multi-layer perceptron with ReLU activations with mean-squared error (MSE) is trained to predict the RUL from the sensor readings. When the sensor reading is above 0, the trained ML model 200 is able to estimate the RUL. When the sensor reading is zero, the trained ML model 200 estimates a 55-day failure time, which, as the mean of the RUL values with sensor reading 0, minimizes the MSE. This output is an estimated failure time. The trained ML model 200 is also trained to output a confidence estimate for the estimated failure time. As such, in the example above, the trained ML model 200 will output a mean 55-day prediction, but also include an approximate variance (confidence) in the prediction such as a 25-day standard deviation when the sensor reading is zero. Thus, based on the uncertainty estimation model, the user of the machine is able to tell that the estimate of 55-day RUL is with a variance of 25 and can analyze risk accordingly.

To generate the trained ML model 200, the training algorithm 206 utilizes uncertainty such as Gaussian-based uncertainty or Laplacian-based uncertainty. In regression tasks, it is typical to assume that the model is a Gaussian:

$$p(y \mid x, \theta) = \frac{1}{\sqrt{2\pi}\,\sigma} \exp\left(-\frac{(y - \mu_\theta(x))^2}{2\sigma^2}\right)$$

with a fixed standard deviation $\delta$, and to minimize the negative log-likelihood of the data, which satisfies $$\prod_{i=1}^{N} p(y^{(i)} \mid x^{(i)}, \theta) \propto \mathcal{L}_{MSE}(x, y, \theta) + c$$

$$\mathcal{L}_{MSE}(x, y, \theta) = \frac{1}{N} \sum_{i=1}^{n} (y^{(i)} - \mu_\theta(x^{(i)}))^2$$

where N is the size of the dataset $D = \{(x^{(i)}, y^{(i)})\}_1^N$.

However, the variance $\delta$ of the model does not need to be constant for all data points and can be a part of the model. As such, a Gaussian with uncertainty can be represented as:

$$p_\theta(y \mid x) = \frac{1}{\sqrt{2\pi}\,\sigma_\theta(x)} \exp\left(-\frac{(y - \mu_\theta(x))^2}{2\sigma_\theta(x)^2}\right)$$

In some embodiments, for a model that is trained using data with Gaussian uncertainty estimation the $L_{MSE-U}$ is optimized allowing for the mean and amount of uncertainty to be learned.

$$\mathcal{L}_{MSE-U}(x, y, \theta) = \frac{1}{N} \sum_{i=1}^{N} \left(\frac{1}{\sigma_\theta(x)^2}(y^{(i)} - \mu_\theta(x^{(i)}))^2 + \log \sigma_\theta(x)\right)$$

In some embodiments, Laplace uncertainty is used such that the model is trained to output a Laplace distribution $$p_\theta(y \mid x, \theta) = \frac{1}{2 b_\theta(x)} \exp\left(-\frac{|y - \mu_\theta(x)|}{b_\theta(x)}\right),$$

And is optimized for the loss function $$\mathcal{L}_{1-U}(x, y, \theta) = \frac{1}{N} \sum_{i=1}^{N} \left(\frac{1}{b_\theta(x)} |y^{(i)} - \mu_\theta(x^{(i)})| + \log b_\theta(x)\right)$$

Training on data with a Gaussian uncertainty estimation (by making the model output $$\frac{1}{\sigma_\theta(x)^2}$$

as a secondary output) or Laplace uncertainty estimation (by making the model output $$\frac{1}{b_\theta(x)^2}$$

as a secondary output), results in confident predictions when the sensor reading is non-zero.

In some embodiments, the trained ML model 200 is a multi-layer perceptron (MLP)-based model 204. The MLP-based model 204 uses only sensor values at the last K frames to make a prediction of RUL at the last frame. In some embodiments, the MLP-based model 204 flattens the input, applies two hidden layers with ReLU activations to the flattened input, and a final layer is used for the final regression.

In some embodiments, the trained ML model 200 is long short-term memory (LSTM)-based model 202. The LSTM-based model 202 processes the last frames one-by-one and feeds its output to a per-frame two-layer MLP model 204 to get the result.

As such, when a new data point comes in to the RUL estimator 112, a determination of a prediction of when the device will fail (estimated failure time) and a confidence interval for that prediction (e.g., +/−days) are output from the trained ML model 200. Note the confidence interval is the standard deviation of the Gaussian and, in some embodiments, is expressed as:

$$\int_0^T p_\theta(y \mid x) = \frac{1}{\sqrt{2\pi \sigma_\theta}(x)} \exp\left(-\frac{(y - \mu_\theta(x))^2}{2\sigma_\theta(x)^2}\right)$$

A benefit of prognostics is to determine whether the machine is going to fail within a prescribed amount of time so that it can be determined whether it should be maintained at the current or a future scheduled maintenance cycle. In some embodiments, a score generator 210 takes in at least the confidence information and scheduled maintenance data (e.g., the number of days until a scheduled maintenance event) to generate a Probabilistic-Fail-Before-Maintenance (PFBM) score. This score estimates the probability of the machine's RUL failing before a time period (T) that will elapse before schedule maintenance event. In some embodiments, this PFBM score is the average of the $L_1$ distance between the label probability (failure or not failure) of the RUL data being less than T and the predicted probability of RUL being less than T.

The output of the RUL estimator 112 includes one or more of: an estimated failure time, a confidence for that estimation (a failure probability), and/or a score which is a failure probability within a time window).

Circles with numbers in them represent an exemplary flow of acts. At circle 1, training data is input to the training algorithm 206 which trains a model at circle 2.

At some later point in time, (sensor) data is received at circle 3. The trained ML model 200 determines an estimated failure time and confidence value at circle 4. In this example, at circle 5, the score generator 210 generates a score.

Figure 3:
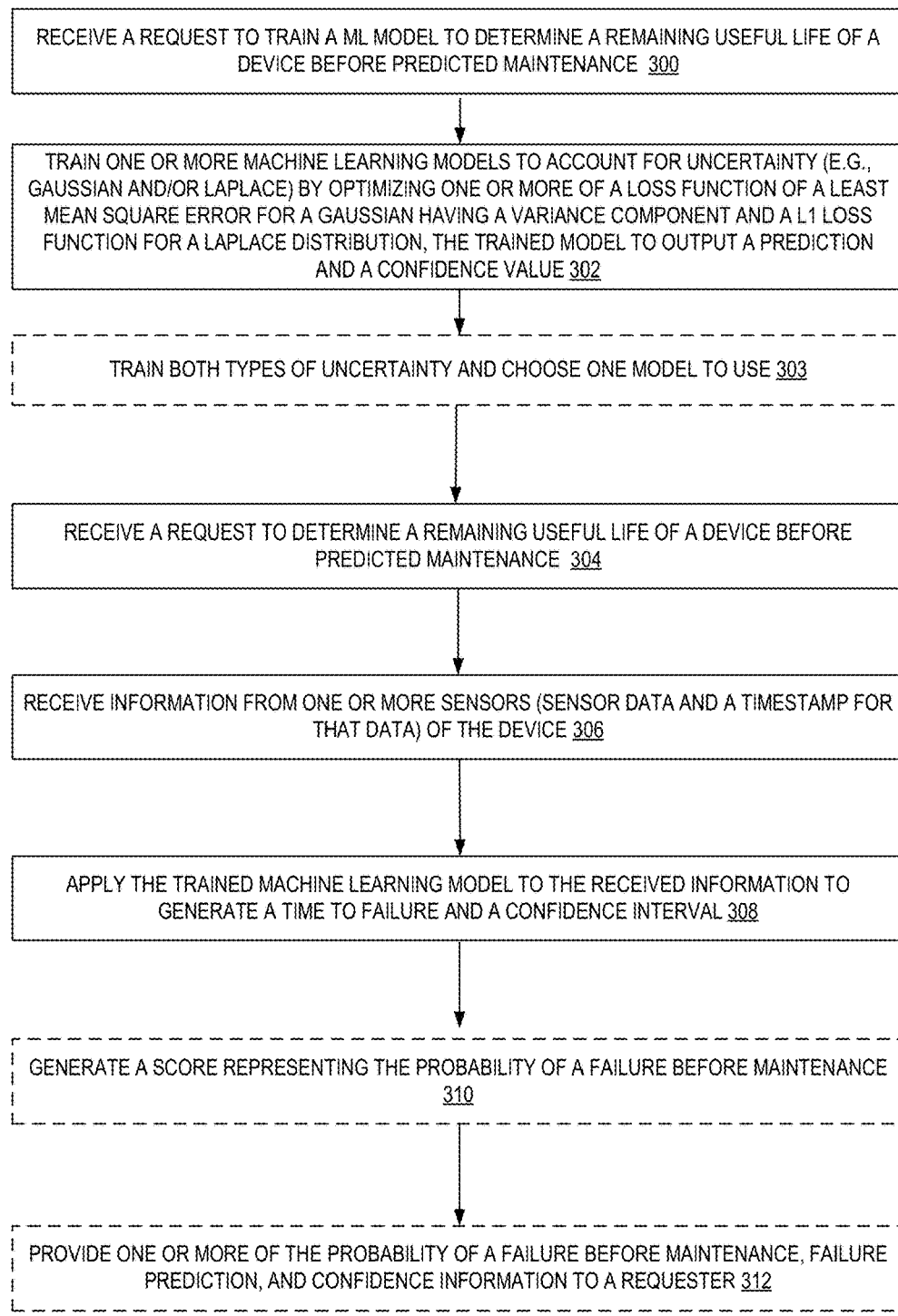
FIG. 3 is a flow diagram illustrating operations of a method for performing RUL estimation according to some embodiments.

FIG. 3 is a flow diagram illustrating operations of a method for performing RUL estimation according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by remaining useful life estimator 112 of the other figures.

A request to train a ML model to determine a remaining useful life of a device before maintenance is received at 300. The request includes at least one or more of: an identifier of a location of an initial labeled data set, an identifier of a location of testing data to test the algorithm or model; actual initial labeled data and/or testing data; identifiers of the algorithms or models to be trained and/or selected from; an identifier of a location to store the trained model(s); and identifiers of execution and memory resources, or types of resources, to use for training. In some embodiments, the request further includes at least one or more of: an identifier of a location of an inference data (sensor data), an identifier of a trained ML model to use to determine RUL; actual initial labeled data and/or testing data; one or more identifiers of users allowed to receive the RUL; identifiers of execution and memory resources, or types of resources, to use for inference; and/or information regarding maintenance schedules for the managed device.

At 302 one or more machine learning models are trained to account for uncertainty (e.g., Gaussian and/or Laplace) by optimizing one or more of a loss function of a least mean square error for a Gaussian having a variance component and a L1 loss function for a Laplace distribution, the trained model to output a prediction and a confidence value.

In some embodiments, when both types of uncertainty are independently used to train a model (e.g., at least two models are trained), a selection of one of the trained models is made at 303. This selection may be based on, for example, historical or training data.

A request to determine a remaining useful life of a device before maintenance is received at 304 in some embodiments. In particular, this request is received when the initial request to train the ML model did not include some of the information needed for inference. The request includes at least one or more of: an identifier of a location of an inference data (sensor data), an identifier of a trained ML model to use to determine RUL; actual initial labeled data and/or testing data; one or more identifiers of users allowed to receive the RUL; identifiers of execution and memory resources, or types of resources, to use for inference; and/or information regarding maintenance schedules for the managed device.

Information from one or more sensors (sensor data and a timestamp for that data) of the managed device is received at 306. In some embodiments, the information is transformed or formatted for consumption by the RUL ML model.

The trained ML model is applied to the received information to generate a time to failure and a confidence interval for that predicted time to failure at 308. In some embodiments, when upcoming maintenance information has been provided, a score representing the probability of a failure before maintenance is generated at 310.

One or more of the failure before maintenance score, the predicted time to failure, and/or confidence information is provided to a requester at 312. The requester may be the one that provided the initial request to determine RUL or another requester that just wants that information.

In some embodiments, a clustering approach to anomaly detection is used as a part of a prognostics and health management service 110. Clusters may be used to: track the health of machines in real time; adaptively learn a sensitivity level that is customized to specific users; accept user feedback in real-time to incorporate modes that were not previously seen, into its learned set of normal modes; learn to correlate a raised alert to any previously logged maintenance events that have similar failure signatures; provide a user a list of features contributing to the flagged anomaly (in some embodiments, in an ordered list wherein the order is determined based on a feature importance measure and, further, in some embodiments, user feedback on the raised alert can be used to adjust the sensitivity of the model to those specific features in the next alert); and filter inaccurate user feedback, the direct incorporation of which can lead to difficulty in being able to identify future anomalous event.

Figure 4:
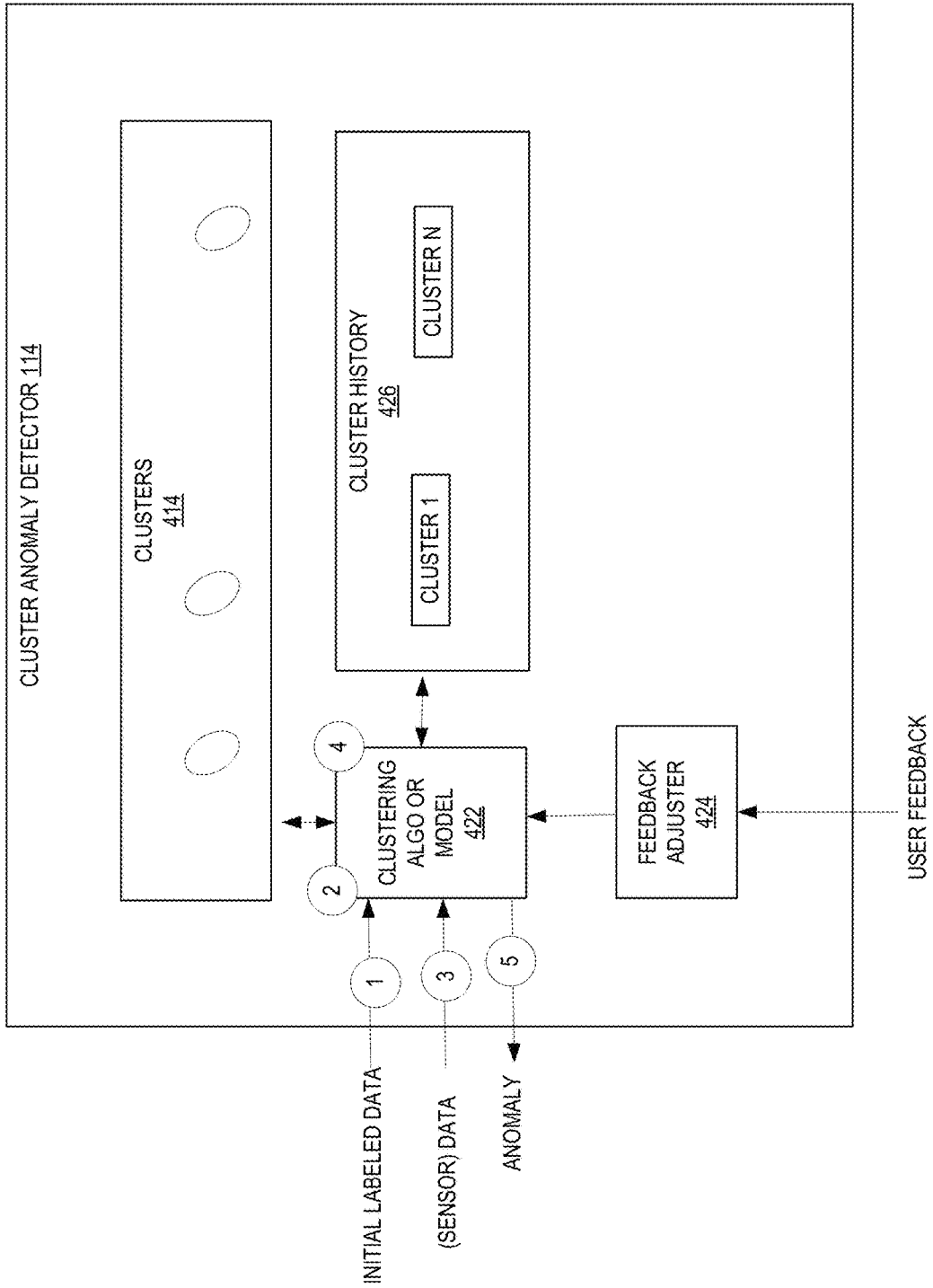
FIG. 4 illustrates a cluster module of a prognostics and health management service such as prognostics and health management service.

FIG. 4 illustrates a cluster module of a prognostics and health management service such as prognostics and health management service 110. The cluster module 114 utilizes an online clustering algorithm or machine learning model 422, a feedback adjuster 424, and cluster history 426. Note that the cluster history may also include metadata such as maintenance acts taken in response to an anomaly, etc.

The online clustering algorithm or machine learning model 422 learns multiple clusters 414 representing different operating modes of a system (such as a machine, group of machines, etc.). Incoming samples are tested to see if they belong to one of these clusters 414 wherein an anomaly in the incoming samples may be detected when it does not belong in one of the clusters 414. Note that some clusters may be used to represent "normal" operation and others may be used to represent "anomalous" operation. In some embodiments, these clusters are labeled (or can be labeled) by a user through the feedback adjuster 424.

In some embodiments, when the incoming data point does not belong to any existing clusters, a new cluster is formed centered at the new point by the clustering algorithm or model 422. Depending on the implementation an alert is raised to notify previously unseen behavior. The online clustering algorithm or machine learning model 422 may then incorporate feedback using feedback adjuster 424 indicating whether this new cluster is a true anomalous event, or a new normal mode. If the feedback indicates that the point is neither of these, then the cluster boundaries of the closest cluster are expanded to incorporate the new point.

In some embodiments, when the incoming data point does belong to any existing cluster, the parameters (e.g., center, boundaries) of that cluster are incrementally updated based on the new point by the clustering algorithm or model 422. Additionally, the history of each cluster is tracked in cluster history 426, and the user is able to graphically visualize such an evolution. For example, the average engine temperature levels of a car operated in its first gear might have increased with every year since its manufacturing. The temperature may also have a cyclic seasonal pattern. All this can be displayed as a plot of a cluster's history over time. Significant drifts of a cluster over time are also flagged as anomalies by the clustering algorithm or model 422.

In some embodiments, when the cluster a new data point is assigned to is an example of previously seen anomalous behavior, and has information logged in from the user on the diagnostics/maintenance done in the past, that can be resurfaced by the clustering algorithm or model 422. A user can be given information that this anomaly signature has occurred previously and that, for example, a maintenance action was needed. Note that the features that are contributing the most towards a point being labeled anomalous can be shown to the customers for diagnostics/explainability.

In some embodiments, user feedback itself can be assigned confidence levels by the feedback adjuster 424. For example, a customer saw a machine as having failed at 5 PM and guesses that the anomalous behavior that preceded the failure could have started roughly at 10 AM. The customer then labels the data from 10 AM to 5 PM as anomalous. Feeding these labels directly to typical training algorithms can be problematic, as the actual failure might just have been a sudden failure with no pre-indication whatsoever. Looking at the sample in duration from 10 AM to 5 PM, and leaving behind those that are clearly inside the clusters that the system identified in previous normal data, can help the clustering algorithm or model 422 to be robust to inaccurate labels.

The circles with numbers in them represent an exemplary flow of acts. At circle 1, labeled data is input to the clustering algorithm or model 422. Typically, the labels indicate if a data is normal or anomalous, however, other labeling conventions may be used. At circle 2, the clustering algorithm or model 422 generates a plurality of clusters and corresponding histories.

At some later point in time, (sensor) data is received at circle 3. The clustering algorithm or model 422 utilizes the clusters (or information about the clusters) to determine what is or is not an anomaly, if there is drift, etc. at circle 4. In this example, there is an anomaly and it is raised at circle 5.

Figure 5:
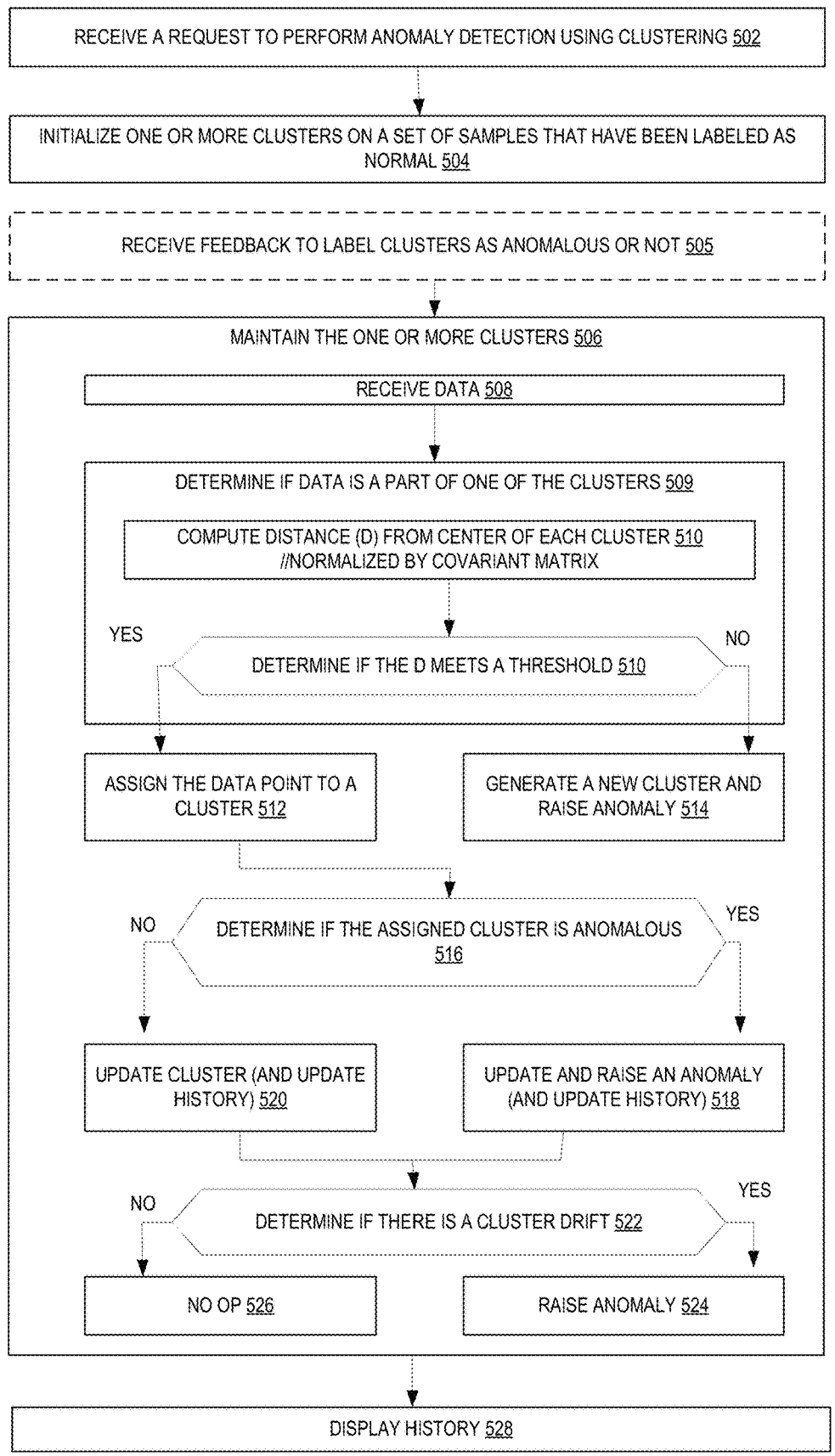
FIG. 5 is a flow diagram illustrating operations of a method for utilizing clustering for anomaly detection according to some embodiments.

FIG. 5 is a flow diagram illustrating operations of a method for utilizing clustering for anomaly detection according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the clustering module 114 of the other figures.

A request to perform anomaly detection using clustering is received at 502. This request may at least include one or more of: an identifier of a location of an initial labeled data set to be used to generate clusters, an identifier of a location of testing data to test the clustering algorithm or model; actual initial labeled data and/or testing data; an identifier of the clustering algorithm or model to be used; an identifier of a location to store a cluster history; an identifier of a location to store clusters; one or more identifiers of users allowed to provide feedback; identifiers of execution and memory resources, or types of resources, to use for clustering; an identifier of what criteria to use to estimate a number of clusters to initialize and how to perform the initialization; and/or one or more identifiers of users allowed to receive anomaly data.

At 504, one or more clusters are initialized on a set of samples that have been labeled as normal. For example, these initial labeled data set identified or provide by the request is used to generate one or more clusters. In some embodiments, an estimate of the number of clusters is performed prior to cluster generation. One or more criteria may be used such as Akaike Information Criterion (AIC), Bayesian Information Criterion (BIC), AICc, Calinski Harabasz Index (CH index), and/or validation using a training dataset with anomalies. Typically, expectation-maximization is then used to generate the estimated number of clusters. In some embodiments, there may not be enough data and an ad-hoc approach is used to generate clusters.

At 505, feedback regarding whether to label clusters as anomalous or not is received in some embodiments.

At 506 the one or more clusters are maintained as new data is evaluated. This maintenance may include updating a cluster (and potentially moving the cluster), keeping a history of at least updates, raising anomalies, and/or generating new clusters.

A data point is received at 508. For example, sensor data is received. A determination of if this data point is a part of one the one or more clusters is made at 509. In some embodiments, this determination includes determining a distance of the data point to each of the clusters (e.g., to the centers of the clusters). The distance calculation typically takes into account means.

These distances are compared to a threshold at 510 to determine if the data point belongs to a cluster. When a distance is less than the threshold, the data point is assigned to that nearest cluster at 512.

When no distance is less than the threshold, a new cluster is generated, and an anomaly raised at 514. This allows a user to determine if the data is truly anomalous (and therefore the cluster should either be marked as anomalous or not utilized). Note that the cluster generation and raising may not happen for one point, but, in some embodiments, are performed when a plurality of points does not have cluster homes.

At 516, a determination is made of if the assigned cluster is anomalous. When it is anomalous, an anomaly is raised and the cluster updated at 518. This alerts the user that there is at least one anomaly. Note that the raising may not happen for one point, but, in some embodiments, is generated when a plurality of points is anomalous. The history for the cluster is also updated.

When the assigned cluster is not anomalous, the cluster is updated at 520. For example, the mean and covariance of the cluster may also be updated using the Woodbury Matrix Identity (WMI). The history for the cluster is also updated.

In some embodiments, a determination of if there is a cluster drift is made at 522. This occurs when the center of the cluster's center has moved too far. When there is no drift, no action needs to be taken at 520. When there appears to be drift, an anomaly is raised at 524 for the cluster and/or data to be evaluated. In some embodiments, the history of one or more clusters is displayed at 528 which may allow for a user to provide better feedback.

Throughout the maintenance, feedback may be used to correct for false positives and/or false negatives in some embodiments. In some embodiments, to correct for false positives, if the point should belong to an existing cluster, the label of that cluster is reset such that a next point assigned to the cluster is not determined to be anomalous. If the point does not belong to an existing cluster, a new cluster is started. In some embodiments, to correct for false negatives, retraining the clustering algorithm or model.

Detailed herein are embodiments directed toward determining and improving the quality of a cloud-based machine monitoring system and its usability in real-time. Signals for tracking the quality may include direct user feedback signals or implicitly inferred by analyzing the user interaction and comparing the system behavior with one customer to other customers. In particular, users of this service expect to be alerted as early as possible of when a machine may run into an issue (a forewarning) and to not have false alerts when the machine is operating normally. As such, the models and/or algorithms used to present alerts should be selected and tuned to meet those expectations.

Figure 6:
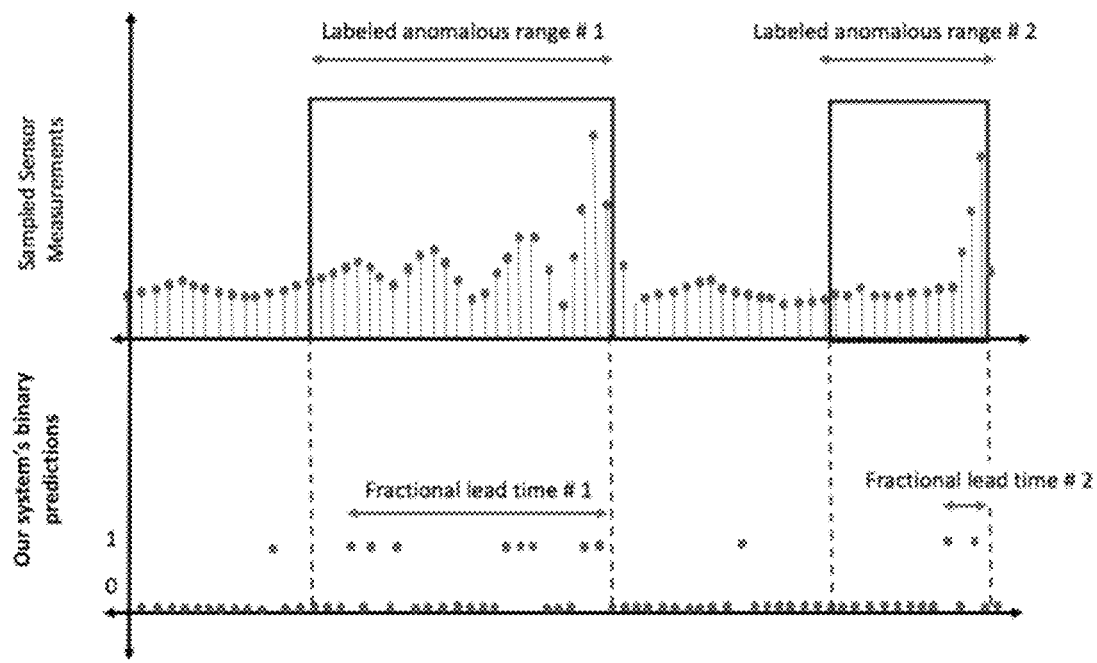
FIG. 6 illustrates embodiments of labeled anomalous ranges and forewarning times.

FIG. 6 illustrates embodiments of labeled anomalous ranges and forewarning times. The top half shows labeled anomalous ranges wherein a labeled anomalous range is a contiguous interval of time inside of which a flag raised is considered as a true positive. In some embodiments, the labels consumed by the model selection/tuning module 116 are a list of such intervals.

The bottom half shows fractional lead times (or forewarning times). A forewarning time is the between the earliest flag raised in a labeled anomalous range and the end of the labeled anomalous range. A goal of the model selection/tuning module 116 is to maximize the forewarning times, while minimizing the number of flags raised outside of the labeled anomalous ranges. Note that the data outside of the labeled anomalous range is considered normal.

Figure 7:
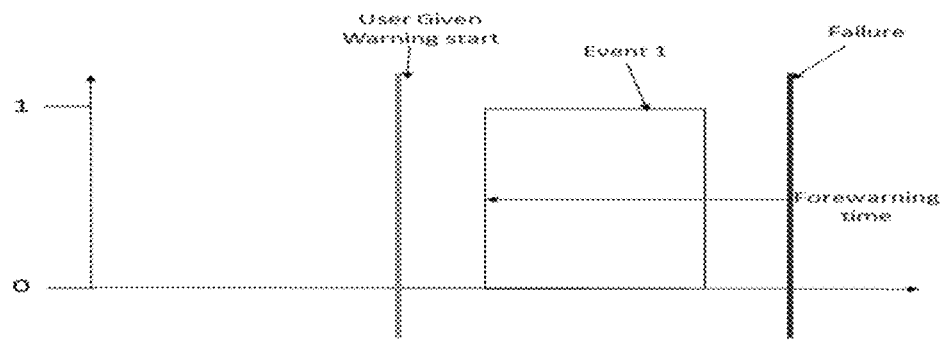
FIG. 7 illustrates exemplary events and their potential relationships to forewarning times and user warnings.
Figure 7:
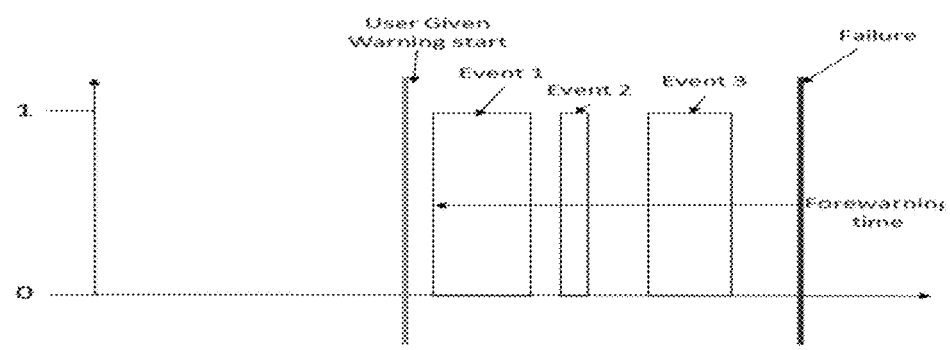
Figure 7:
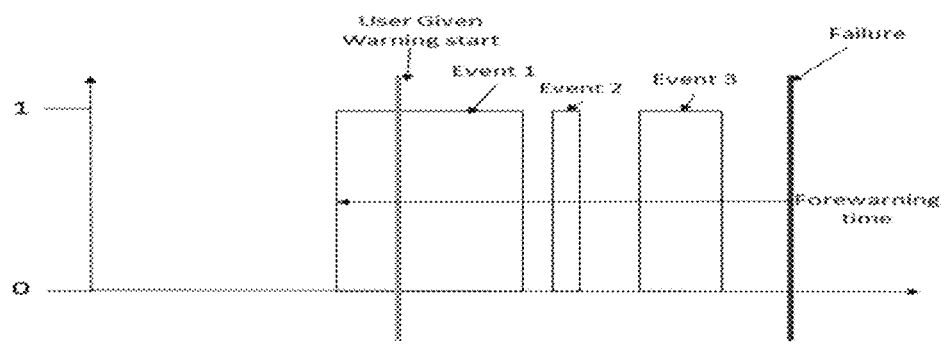
Figure 7:
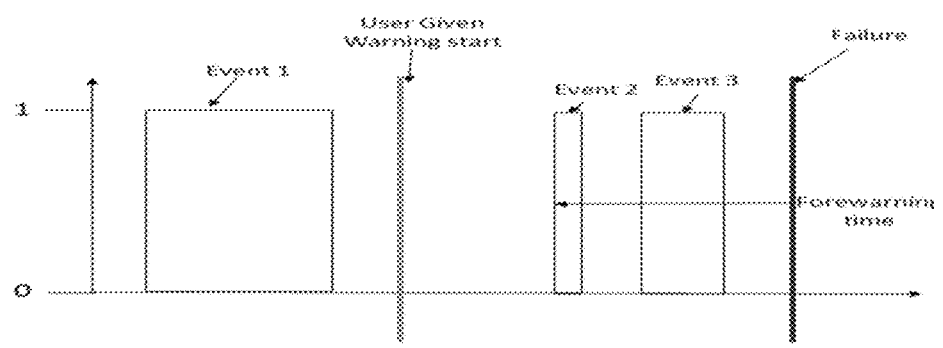

FIG. 7 illustrates exemplary events and their potential relationships to forewarning times and user warnings. An event is anytime an alert would have been generated. For example, if an anomaly is detected (after smoothing), then an alert would be generated. An event continues until there is no detected anomaly.

The top event example (A) shows an event occurs inside the forewarning window but does not persist until the failure point given by the user. This is caught failure with the forewarning time at the start of the event. As the user labels may be wrong or off, this is still a true positive event. The non-anomalous times in the window do not count as false negatives.

The next event example (B) shows multiple events occurring inside the user defined failure window. Together these events count as one true positive and no false negatives. The forewarning time is the time of the first event inside this window. As a machine may go in and out of states as is trends towards failure, it is not uncommon to see this pattern.

The next event example (C) shows examples in which the first event occurs outside the user defined window. There is one true positive and no false positives and no false negatives. The one true positive is because from a user perspective the question is whether or not a failure was caught.

The final event example (D) shows how to count a false positive. In the example below the first event counts as one false positive, event two and three count as one true positive and the forewarning time is indicated by the start of event two.

The scoring metric need to evaluate the models and algorithms that find potentially anomalous events should find anomalous events within a defined failure window, optimize for the model that has the longest forewarning times, and reduce false positives.

Figure 8:
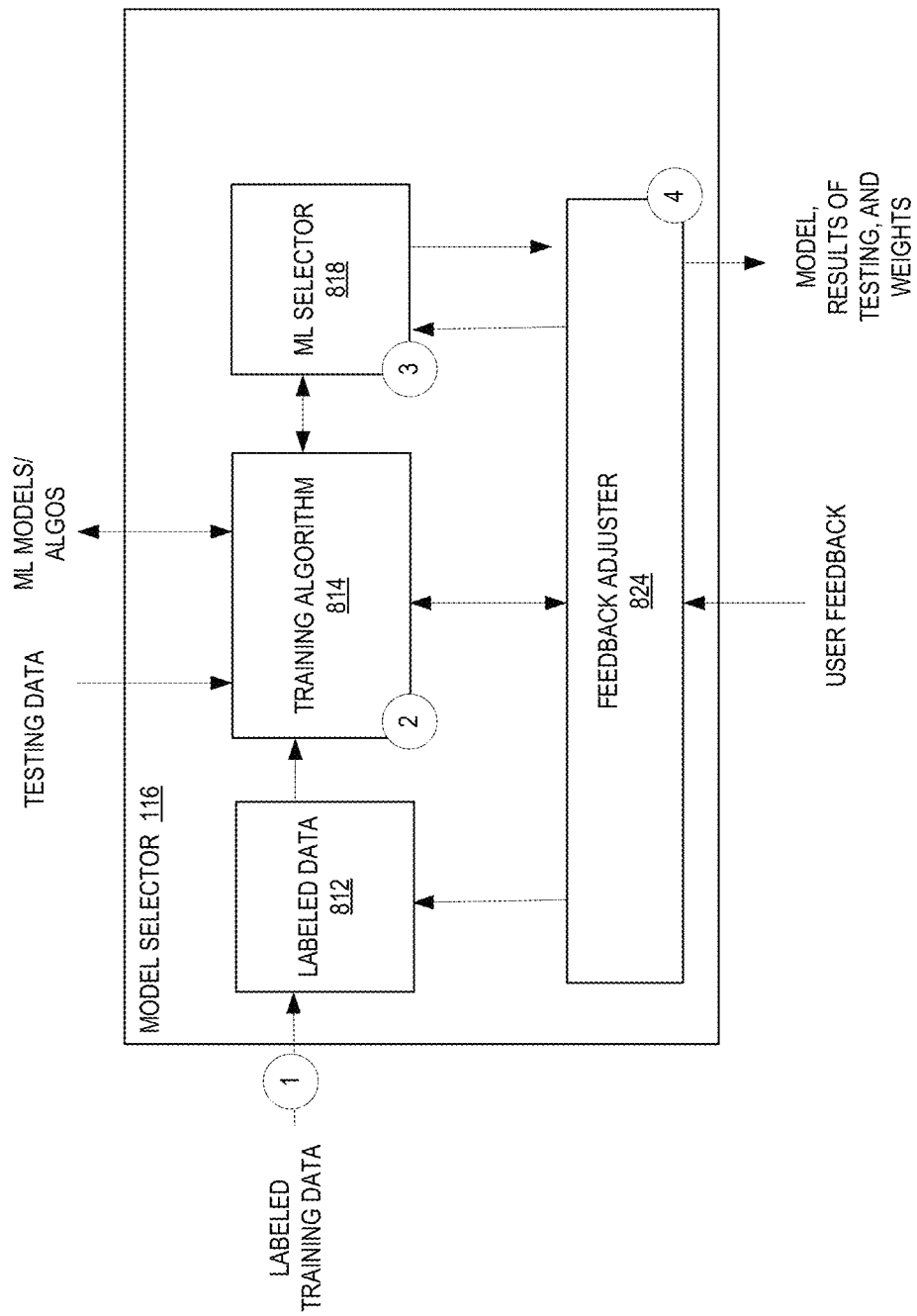
FIG. 8 illustrates embodiments of a model selection/tuning aspect (e.g., module or service) which trains and/or selects ML models or algorithms for use in, for example, machine monitoring.

FIG. 8 illustrates embodiments of a model selection/tuning aspect (e.g., module or service) 116 which trains and/or selects ML models or algorithms for use in, for example, machine monitoring. In some embodiments, there are at least two times where metrics for evaluating a model's performance are used: during model selection and for reporting the performance of the final model to the user, so that they have an idea of the model's performance after training. Selecting appropriate evaluation criteria for these two tasks are related, but different efforts. The main difference is that the metrics used for model selection can have more leeway in terms of how interpretable they are to a user. On the other hand, for reporting metrics to the user, the numbers must be clearly interpretable and of direct significance.

In some embodiments, one or more of the following metrics are utilized in the generation of a report (e.g., model selection, model performance, etc.) to a user: forewarning times of how much in advance of a failure can an alert be raised; event recall of how many failure events were alerted to in advance; and durations of other events that can be alerted to, but that do not have prior annotations as being anomalous (not all such events are actual false positives as some could be the machine operating in modes that were not seen during training, due to various verifiable reasons).

For model selection, a weighted harmonic mean of the following metrics is used. In some embodiments, for this mean, takes into consideration event recall, event precision, forewarning time, and area under the curve.

The event recall is a fraction of labeled anomalous ranges where at least one flag was raised.

In some embodiments, the forewarning time is measured as a mean fraction defined as follows:

mean_frac_lead_time=np.mean([(anomaly.end_time−
anomaly.earliest_detection_time_within_the_r-
ange)/(anomaly.end_time−anomaly.start_time)
for anomaly in detected_anomalies])

The event precision is computed as:

Event precision=num_true_positives/(num_true_posi-
tives+windowed_false_positives)

where num_true_positives is the number of user labeled anomalous ranges that were detected by the system.

The area under the curve is the area under the receiver operating characteristic (ROC) curve. This metric is independent of thresholds which have a potential to over-fit to the few anomalies that are expected in the validation set.

Each of these metrics has an associated weight such as event precision has a weight of 1, the mean fractional lead time has a weight of 1, the event recall has a weight of 2, and the AUC has a weight of 4.

To determine which model to select based on the weighted harmonic mean, the model selection/tuning module 116 receives labeled training data 812 which is typically a multi-dimensional time series dataset consisting of measurements from multiple sensors installed on a machine. The labeled data 812 also includes 0 or more intervals that indicate time instances when a machine failed and the time duration preceding each failure where it is believed an early detection of the failure could have been possible.

This data is used by a training algorithm 814 to train a plurality of ML models from one or more ML algorithms or existing models. An ML selector 818 selects one of the trained ML models based on a calculation of weighted harmonic means for each of the trained ML models.

A feedback adjuster 824 uses explicit or implicit feedback to adjust the model selection, labeled data 812, and/or the training of one or more ML models. Implicit feedback includes number of discarded alerts which are interpreted by the system as a noisy signal for the false positive detections. Another implicit signal is off-schedule maintenance events in the absence of any alarms which could be interpreted as a false negative. The time spent reviewing an alert, the density of the datapoints raising the alert due to similar statistics can also be interpreted as implicit user feedback. The feedback adjuster 824 may also provide reports in the model such as what model was selected, results of the testing of that model, and/or weights of the model.

Note that the feedback can be delayed. For example, an upload of explicit maintenance records can update the labeled data 812 for previously uploaded sensor data since typically maintenance is performed at a later date. The delayed feedback will be used to update the metrics shown above and may result in a new ML model selection. Other kinds of explicit feedback may include, but are not limited to: changing of the weights, changing of the algorithm or model to train, the training approach to use, etc.

In some embodiments, to probe interaction with the model selection/tuning module 202 the feedback adjuster performs content injection to purposefully raise a maintenance alert or alters the severity of the alert in-between scheduled maintenance or by lowering the anomaly score threshold at a random time. The reaction of a user allows for a measurement the responsiveness of the user. For example, if the user does not turn it off, it means with high probability, the user is not using the system output which could indicate that either the false positive rate is too high or there are missed important alerts and hence, a retraining is important.

The circles with numbers in them represent an exemplary flow of acts. At circle 1, labeled data is input to the training algorithm 814. At circle 2, the training algorithm 814 trains one or more models. At circle 3, the ML selector 818 selects one or more of the trained models, or a model from other models that had previously been trained. At circle 4, the feedback adjuster 824 provides a report of the selected model, results of the testing of the model, and/or weights of the model.

Figure 9:
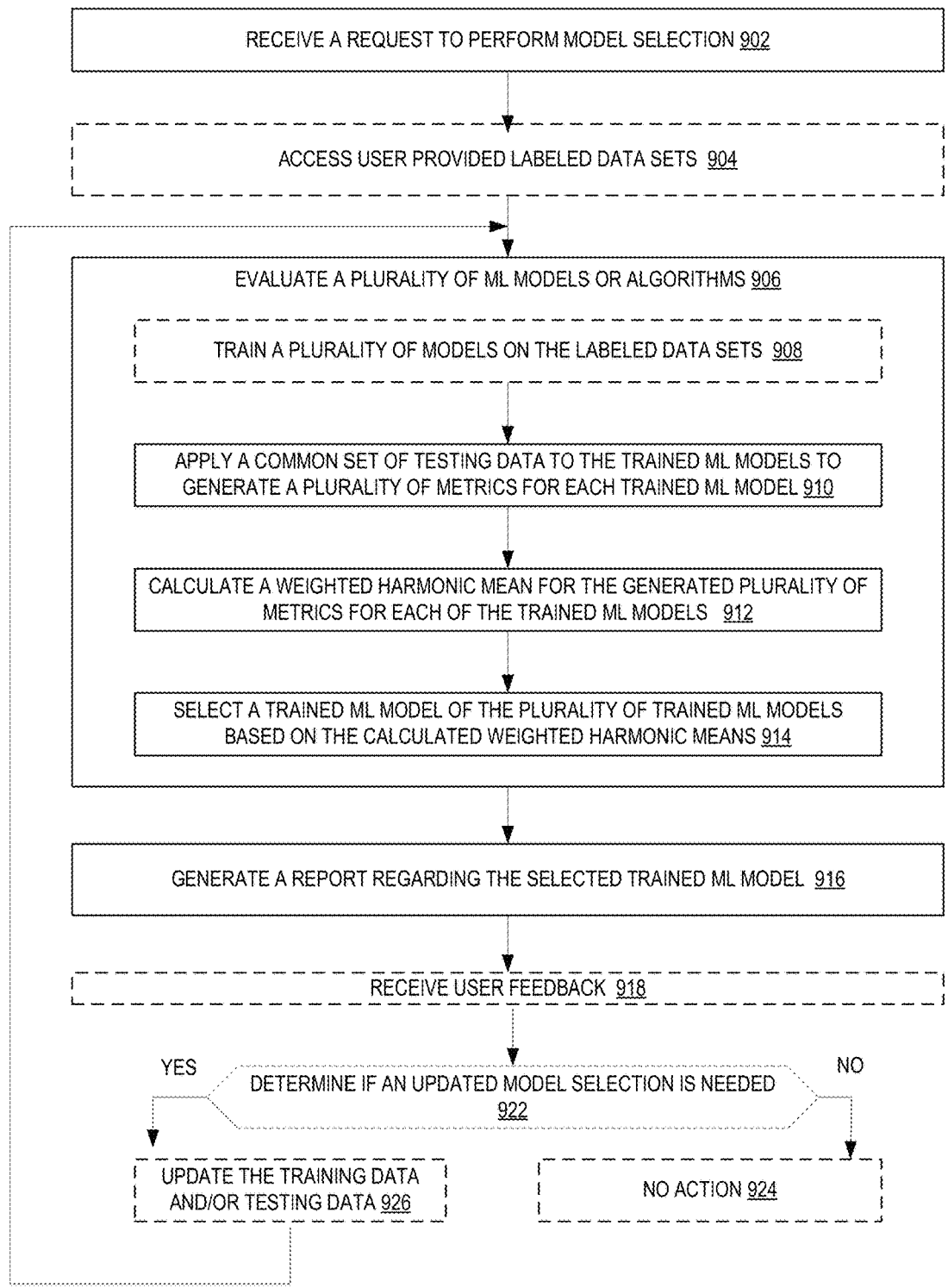
FIG. 9 is a flow diagram illustrating operations of a method for at least selecting a model according to some embodiments.

FIG. 9 is a flow diagram illustrating operations of a method for at least selecting a model according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the model selection/tuning module 116 of the other figures.

A request to perform model selection is received at 902. The request includes at least one or more of: an identifier of a location of an initial labeled data set, an identifier of a location of testing data to test the algorithm or model; actual initial labeled data and/or testing data; identifiers of the algorithms or models to be trained and/or selected from; an identifier of a location to store the selected model(s); one or more identifiers of users allowed to provide feedback; identifiers of execution and memory resources, or types of resources, to use for training and/or selection; an identifier of what weights to use in the selection of a ML model; and/or one or more identifiers of users allowed to receive anomaly data.

At 904, user provided labeled data sets are accessed in some embodiments (e.g., when not provided as a part of the request).

A plurality of ML models or algorithms are evaluated at 906. This evaluation includes the selection of one or more models based at least in part on calculations of weighted harmonic means for models.

At 908, a plurality of models is trained on provided labeled data sets in some embodiments. Note that in some embodiments, the ML models have already been trained and this training does not need to occur. A common set of testing data is applied to the trained ML models to generate a plurality of metrics for each trained ML model at 910. As noted, the request may point to this testing data or be supplied by the request. The metrics at least include at least two of event recall, event precision, forewarning time, and area under the curve for each trained ML model.

Using these metrics, a weighted harmonic mean is calculated for each of the trained ML models at 912 using at least two of the generated metrics. These weighted harmonic means are used to select at least one trained ML model of the plurality of trained ML models at 914.

A report may include information such as an identifier of the selected model, results of the testing of the model, and/or weights of the model.is generated regarding the selected trained ML model at 916. Other information that may offer includes, for each of the labeled anomalous ranges, if the anomalous range was detected and/or with how much forewarning time was it detected. In some instances, false positives are also reported when consecutively occurring point-wise false positives are aggregated into distinct events. False positives may include ranges and durations.

In some embodiments, this report is for the initial selection. Note that reports for injected content may also be generated during the life of a selected ML model.

In some embodiments, user feedback is received at 918. This feedback could be based on the report about the selected ML model, on injected content, and/or on usage of the selected ML model and its accuracy. This feedback may include new labels, weights, training data, etc. as detailed above.

In some embodiments, a determination of if retraining and an updated model selection is needed is made at 922. For example, did a user respond to injected content? If not, this may indicate a retraining is needed. Or, if the user indicated the results of the ML model were erroneous, a retraining and selection may be needed. When updating and/or selection should be performed, in some embodiments, the training data and/or testing data is updated at 926 and the evaluation of 906 begins. When no update or retraining is needed, no action is taken at 924.

Unfortunately, not all data for managed devices is labeled. As such, training a model can be much more difficult and labor intensive (e.g., requiring human labeling, etc.). Detailed herein are embodiments that incorporate embeddings of previously seen machine data (such as vibration) along with feature space embeddings to develop a model to handle previously unseen machine data. This allows for training without historical data, thereby saving training time and solving cold start problem which is common in this domain.

In particular, model transfer aspect (e.g., module or service) 118 determines the compatibility (likeness) between feature embeddings of a certain machine and class label embeddings. The class label takes into account the metadata of the machine. The metadata may exhibit a taxonomical hierarchy describing the machine and its operation environment such as rotating machinery, gear box, manufactured by X, of type Y, installed in a facility manufacturing Z during a certain time, etc. In some embodiments, a domain-specific (label) embeddings model (e.g., similar to Word2Vec) is used to generate class label and tags embeddings and another model (e.g., VGGish) is used to extract a feature embedding. Note that the label embedding can take into account the user input as well where the user can group data based on some metadata fields.

In some embodiments, the compatibility is a quadratic form of the embedding vector of the labels and is learned as a regression problem. After estimating the compatibility model parameters, a classification task of the feature vectors based on the label vectors is solved taking the compatibility measure into account. For a new data point of previously unseen machine, a label vector is selected which maximizes the compatibility of the class and feature vector embeddings. This class is then used as normal operating mode for the new machine. Once labels are available for this machine, the model can be further tuned.

Figure 10:
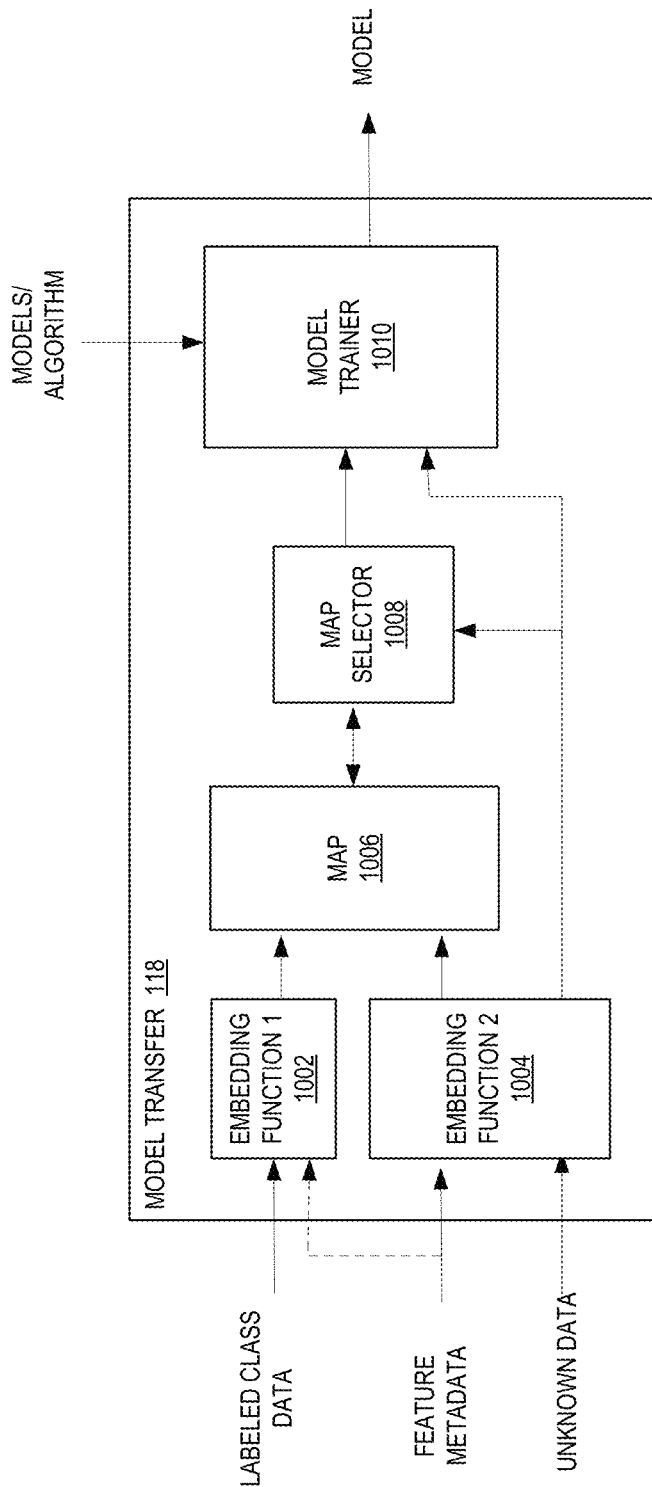
FIG. 10 illustrates embodiments of a model transfer.

FIG. 10 illustrates embodiments of a model transfer 118. As shown, a first embedding function 1002 (such as a domain-specific embeddings model such as Word2Vec) takes in labeled class data and generates class label (and/or tags) embeddings. A second embedding function 1004 (such as VGGish) takes in feature metadata and generates a feature embedding. The class label embeddings and feature embeddings are related in one or more maps (e.g., matrices) 1006. For example, when metadata and class data is known for a particular machine or machine type a map that shows the correspondence between the label and feature embeddings is generated. Note that a single matrix, if used, could hold these relationships for multiple machines, but in some embodiments a hierarchical approach is used having multiple matrices.

A map selector 1008 takes in feature embeddings from unknown data (generated by applying the same embedding function 1004 that was applied to other features) and compares those feature embeddings to the one or more maps 1006 to find a closest match. The corresponding label is then used as a pseudo label for the training of a model by model trainer 1010 along with the feature embeddings from the unknown data. The trained model may be generated from an algorithm or from an existing model as a classifier. In some embodiments, at least the final layer is stripped from this trained model and that deprecated model is used for inference (and can be subsequently trained). In some embodiments, the trained model performs the embedding functionality.

Figure 11:
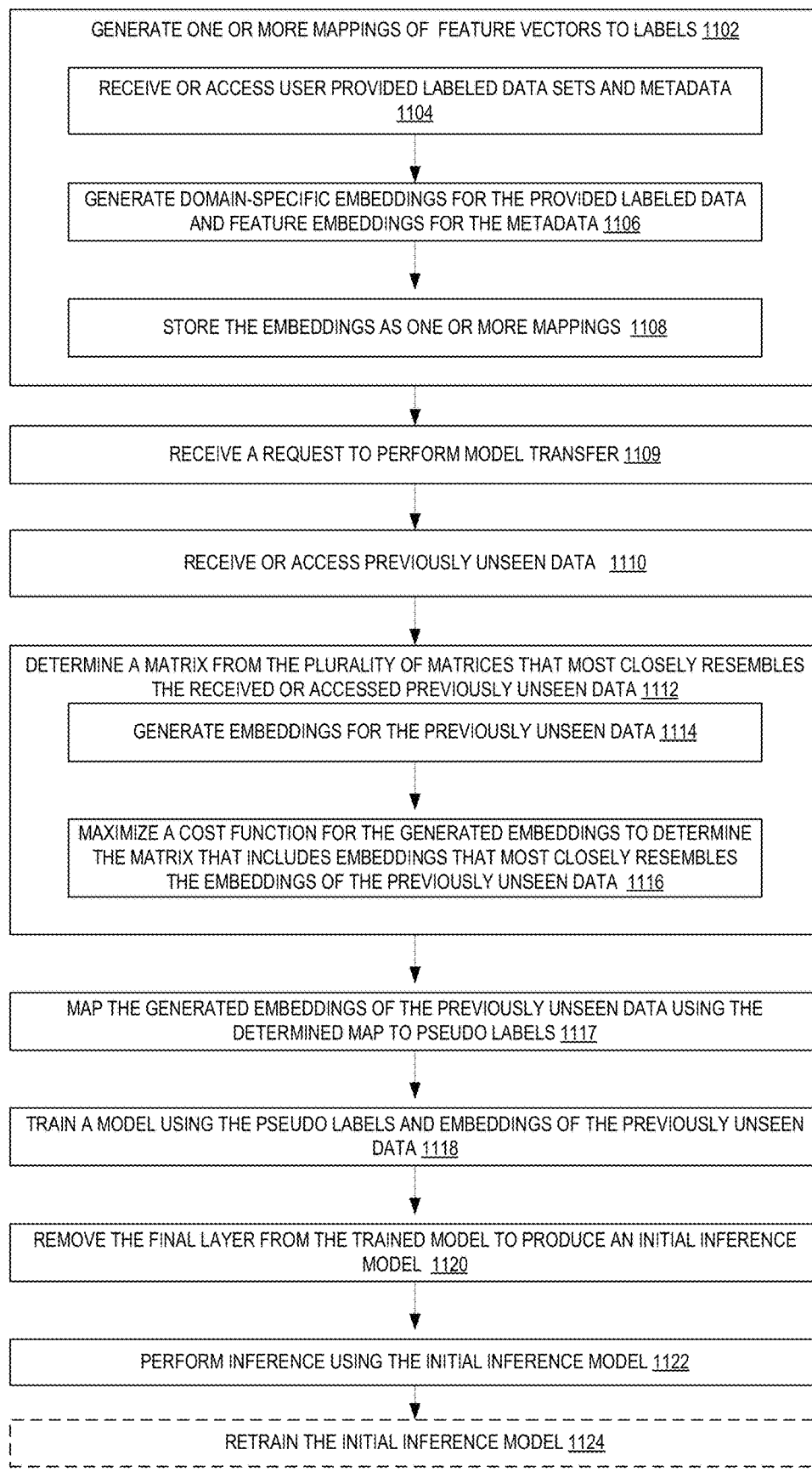
FIG. 11 is a flow diagram illustrating operations of a method for model transfer according to some embodiments.

FIG. 11 is a flow diagram illustrating operations of a method for model transfer according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the model transfer 118 of the other figures.

One or more mappings of feature vectors to labels are generated at 1102. This generation may include several acts. At 1104, user provided labeled data sets and metadata are received or accessed. Domain-specific embeddings for the provided labeled data and feature embeddings for the metadata are generated at 1106. As detailed above, this may be performed using one or more ML models. The generated embeddings are stored as one or more mappings that show a correspondence between feature embeddings and class labels at 1108.

At 1109 a request to perform model transfer is received. The request may at least include one or more of: an identifier of a location of a previously unseen unlabeled data set to be used to train the model; actual previously unseen unlabeled data; an identifier of the algorithm or model to be trained; identifiers of execution and memory resources, or types of resources, to use for clustering; and/or one or more identifiers of users allowed to receive an output of the trained model.

At 1110, previously unseen data is accessed or received.

A determination of which mapping from the plurality of mappings that includes an embedding that most closely resembles the received or accessed previously unseen data is made at 1112. In some embodiments, this determination includes generating embeddings for the previously unseen data at 1114 and then using a cost function or other comparison function to determine the embedding of the mappings that most closely resembles the embeddings of the previously unseen data at 1116.

The determined mapping is used to map the generated embeddings of the previously unseen data to pseudo labels at 1117. In other words, as there are not known labels, the labels of the mapping that correspond to a similar feature vector embedding are used as labels for training.

A model is trained using the pseudo labels and generated embeddings of the previously unseen data at 1118. Note that the model may already exist and is retrained. At least a final layer is removed from the trained model to produce an initial inference model at 1120. The initial inference model is used for inference on new data at 1122. Note that as labeled data is made available, the initial inference model may be retrained in some embodiments at 1124. In some embodiments, the trained model is an anomaly detection model.

Figure 12:
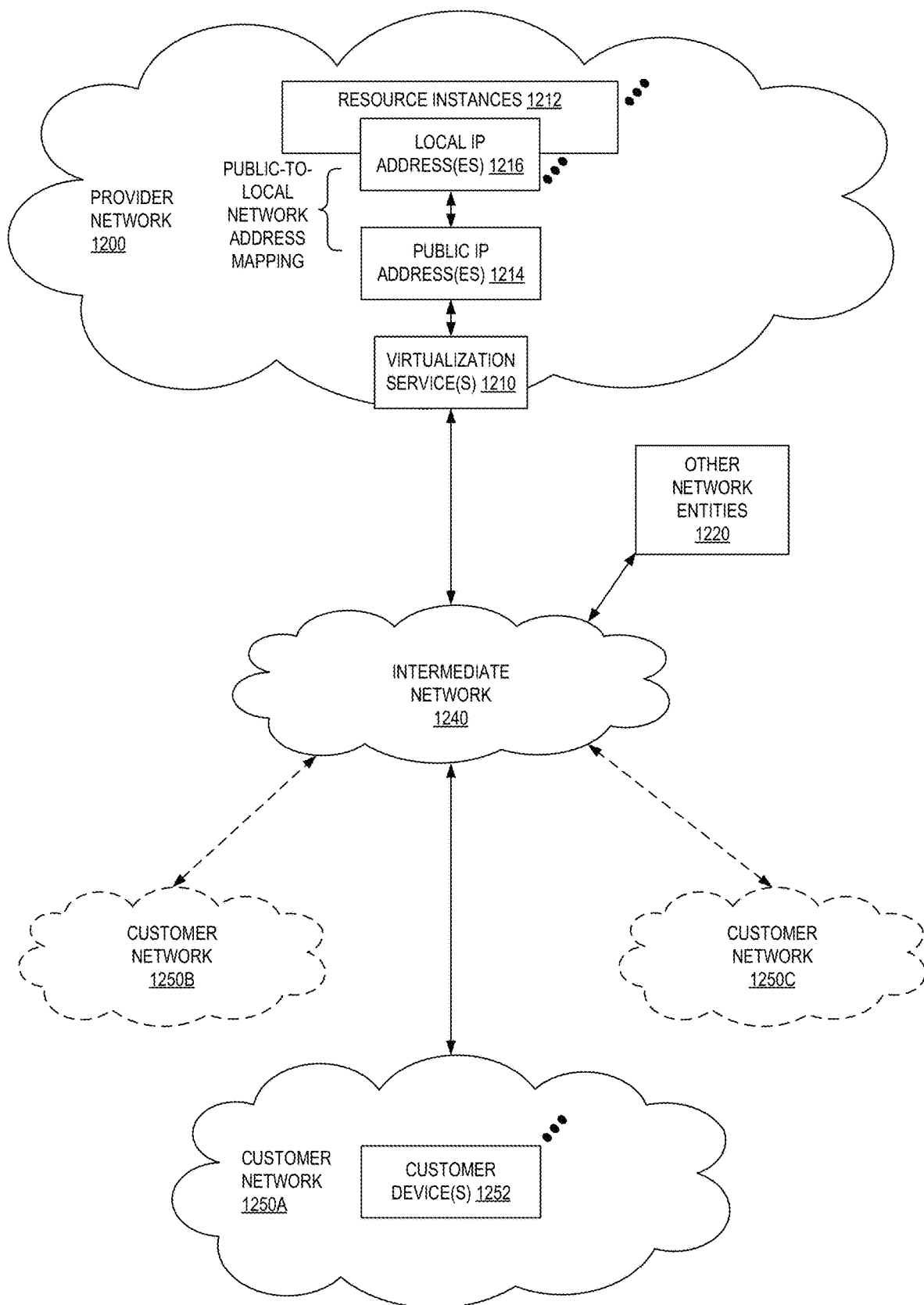
FIG. 12 illustrates an example provider network environment according to some embodiments.

FIG. 12 illustrates an example provider network (or "service provider system") environment according to some embodiments. A provider network 1200 may provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 may be associated with the resource instances 1212; the local IP addresses are the internal network addresses of the resource instances 1212 on the provider network 1200. In some embodiments, the provider network 1200 may also provide public IP addresses 1214 and/or public IP address ranges (e.g., Internet Protocol version 4 (IPv4) or Internet Protocol version 6 (IPv6) addresses) that customers may obtain from the provider 1200.

Conventionally, the provider network 1200, via the virtualization services 1210, may allow a customer of the service provider (e.g., a customer that operates one or more client networks 1250A-1250C including one or more customer device(s) 1252) to dynamically associate at least some public IP addresses 1214 assigned or allocated to the customer with particular resource instances 1212 assigned to the customer. The provider network 1200 may also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of customer network(s) 1250A-1250C may, for example, implement customer-specific applications and present the customer's applications on an intermediate network 1240, such as the Internet. Other network entities 1220 on the intermediate network 1240 may then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 may be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1200; a customer may then assign their allocated public IP addresses to particular resource instances allocated to the customer. These public IP addresses may be referred to as customer public IP addresses, or simply customer IP addresses. Instead of being assigned by the provider network 1200 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
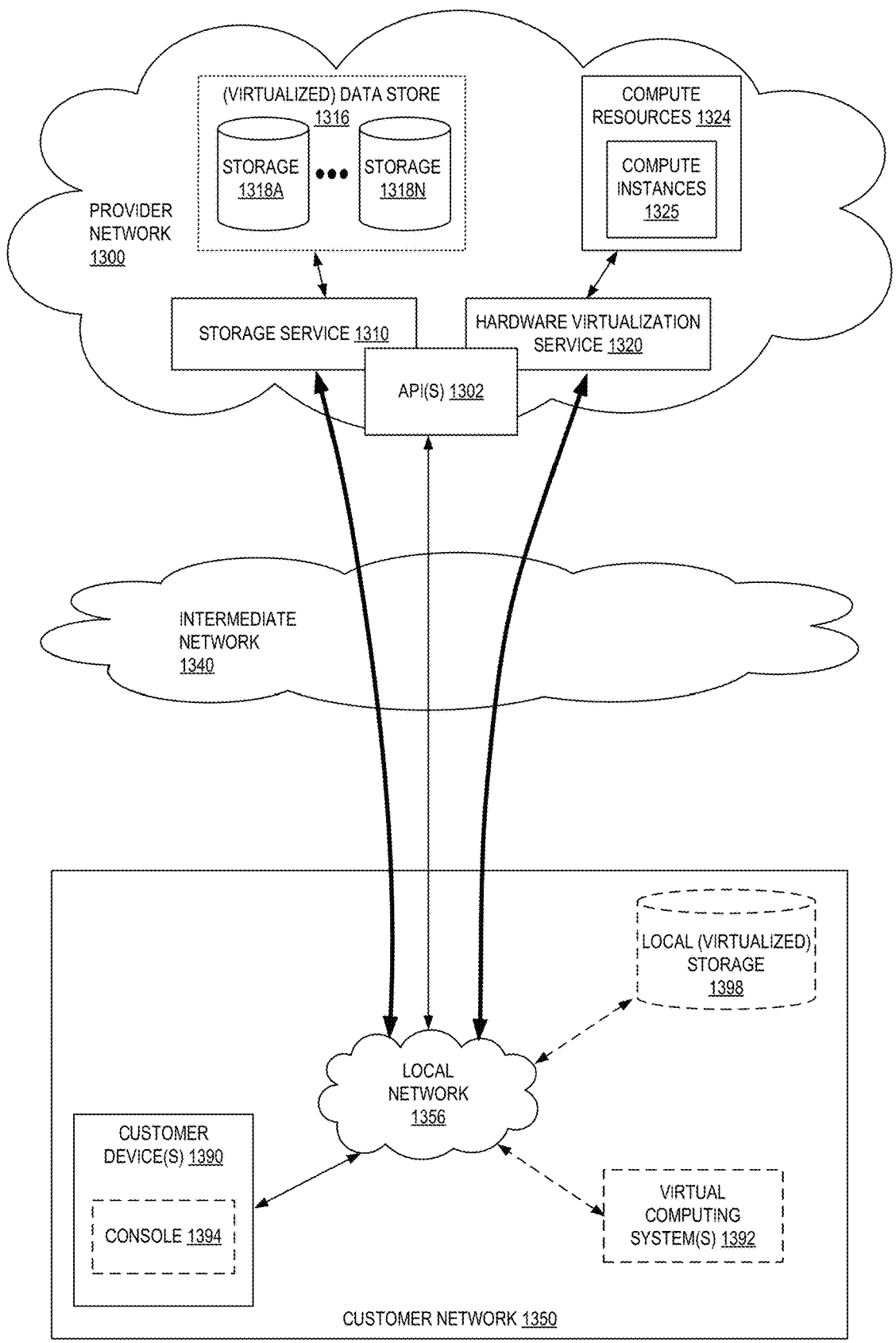
FIG. 13 is a block diagram of an example provider network that provides a storage service and a hardware virtualization service to customers according to some embodiments.

FIG. 13 is a block diagram of an example provider network that provides a storage service and a hardware virtualization service to customers, according to some embodiments. Hardware virtualization service 1320 provides multiple compute resources 1324 (e.g., compute instances 1325 such as VMs) to customers. The compute resources 1324 may, for example, be rented or leased to customers of the provider network 1300 (e.g., to a customer that implements customer network 1350). Each computation resource 1324 may be provided with one or more local IP addresses. Provider network 1300 may be configured to route packets from the local IP addresses of the compute resources 1324 to public Internet destinations, and from public Internet sources to the local IP addresses of compute resources 1324.

Provider network 1300 may provide a customer network 1350, for example coupled to intermediate network 1340 via local network 1356, the ability to implement virtual computing systems 1392 via hardware virtualization service 1320 coupled to intermediate network 1340 and to provider network 1300. In some embodiments, hardware virtualization service 1320 may provide one or more APIs 1302, for example a web services interface, via which a customer network 1350 may access functionality provided by the hardware virtualization service 1320, for example via a console 1394 (e.g., a web-based application, standalone application, mobile application, etc.). In some embodiments, at the provider network 1300, each virtual computing system 1392 at customer network 1350 may correspond to a computation resource 1324 that is leased, rented, or otherwise provided to customer network 1350.

From an instance of a virtual computing system 1392 and/or another customer device 1390 (e.g., via console 1394), the customer may access the functionality of storage service 1310, for example via one or more APIs 1302, to access data from and store data to storage resources 1318A-1318N of a virtual data store 1316 (e.g., a folder or "bucket", a virtualized volume, a database, etc.) provided by the provider network 1300. In some embodiments, a virtualized data store gateway (not shown) may be provided at the customer network 1350 that may locally cache at least some data, for example frequently-accessed or critical data, and that may communicate with storage service 1310 via one or more communications channels to upload new or modified data from a local cache so that the primary store of data (virtualized data store 1316) is maintained. In some embodiments, a user, via a virtual computing system 1392 and/or on another customer device 1390, may mount and access virtual data store 1316 volumes via storage service 1310 acting as a storage virtualization service, and these volumes may appear to the user as local (virtualized) storage 1398.

While not shown in FIG. 13, the virtualization service(s) may also be accessed from resource instances within the provider network 1300 via API(s) 1302. For example, a customer, appliance service provider, or other entity may access a virtualization service from within a respective virtual network on the provider network 1300 via an API 1302 to request allocation of one or more resource instances within the virtual network or within another virtual network.

Illustrative Systems

Figure 14:
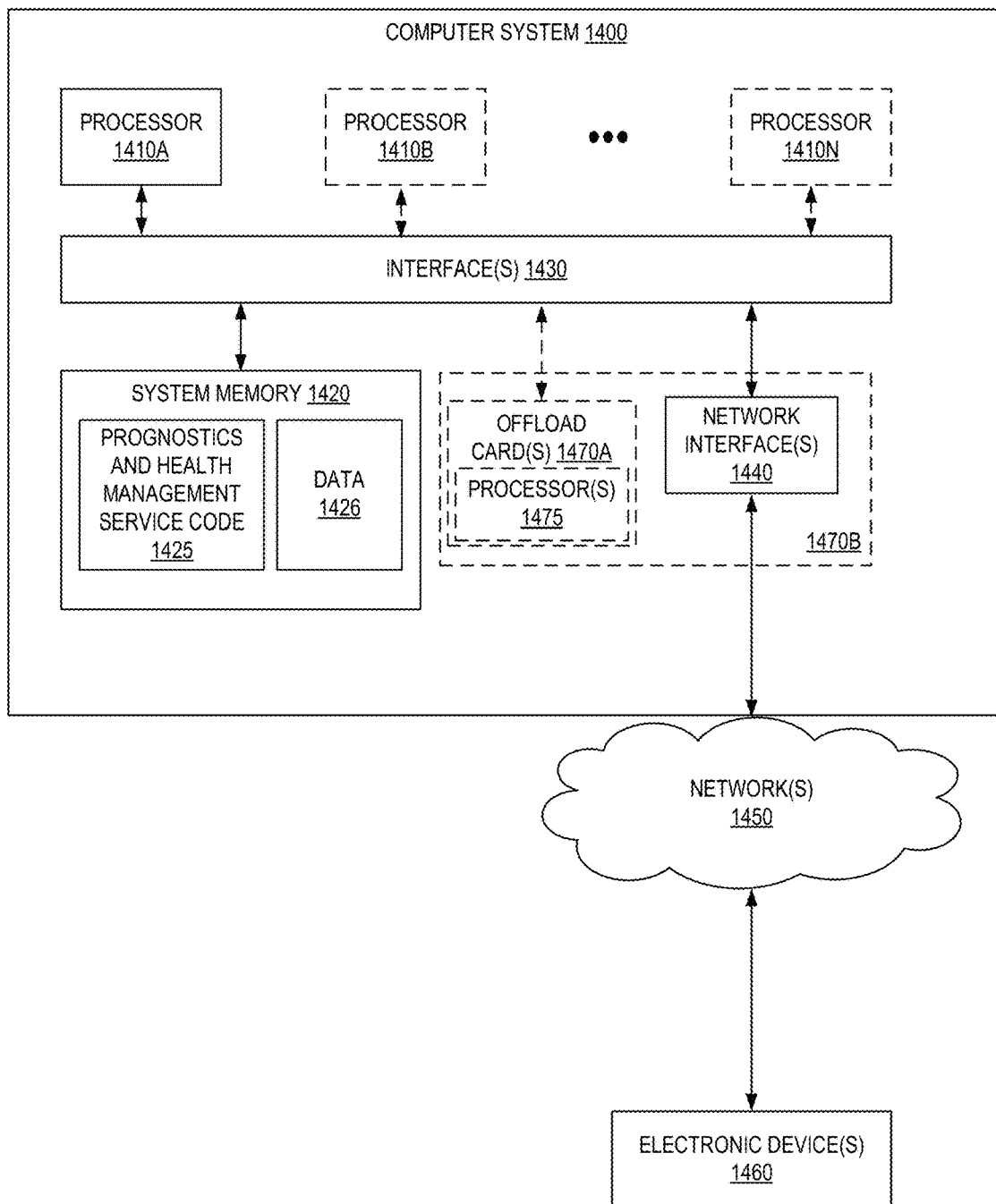
FIG. 14 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1400 illustrated in FIG. 14. In the illustrated embodiment, computer system 1400 includes one or more processors 1410 coupled to a system memory 1420 via an input/output (I/O) interface 1430. Computer system 1400 further includes a network interface 1440 coupled to I/O interface 1430. While FIG. 14 shows computer system 1400 as a single computing device, in various embodiments a computer system 1400 may include one computing device or any number of computing devices configured to work together as a single computer system 1400.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1410 may commonly, but not necessarily, implement the same ISA.

System memory 1420 may store instructions and data accessible by processor(s) 1410. In various embodiments, system memory 1420 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1420 as prognostics and health management service code 1425 (e.g., executable to implement, in whole or in part, the prognostics and health management service 110) and data 1426.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1450, such as other computer systems or devices as illustrated in FIG. 1, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1400 includes one or more offload cards 1470A or 1470B (including one or more processors 1475, and possibly including the one or more network interfaces 1440) that are connected using an I/O interface 1430 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1400 may act as a host electronic device (e.g., operating as part of a hardware virtualization service) that hosts compute resources such as compute instances, and the one or more offload cards 1470A or 1470B execute a virtualization manager that can manage compute instances that execute on the host electronic device. As an example, in some embodiments the offload card(s) 1470A or 1470B can perform compute instance management operations such as pausing and/or un-pausing compute instances, launching and/or terminating compute instances, performing memory transfer/copying operations, etc. These management operations may, in some embodiments, be performed by the offload card(s) 1470A or 1470B in coordination with a hypervisor (e.g., upon a request from a hypervisor) that is executed by the other processors 1410A-1410N of the computer system 1400. However, in some embodiments the virtualization manager implemented by the offload card(s) 1470A or 1470B can accommodate requests from other entities (e.g., from compute instances themselves), and may not coordinate with (or service) any separate hypervisor.

In some embodiments, system memory 1420 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic.

Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to perform machine health anomaly detection for a machine using clusters;
   performing the machine health anomaly detection, the performing comprising:
      initializing a first one or more clusters on a set of samples that have been labeled as normal, wherein the initialized one or more clusters are associated with normal operating modes of the machine;
      receiving a data point from a sensor; and
      determining when the received data point is a part of one of the first one or more clusters utilizing a distance to centers of the one or more clusters, wherein the determining further comprises:
         when the received data point is determined to belong to one of the first one or more clusters associated with normal operating modes of the machine, assigning the received data point to the determined cluster, updating the cluster, and updating a history for the cluster,
         when the received data point is determined to belong to one of a second one or more clusters associated with anomalous operating modes of the machine, raising an anomaly, updating the cluster, and updating a history for the cluster, and
         when the received data point is determined to not belong to any existing cluster, creating a new cluster associated with the received data point, raising an anomaly, and, based at least in part on user feedback related to the raised anomaly, identifying the received data point as being associated with one of a new anomalous operating mode of the machine or a new normal operating mode of the machine, or, if the user feedback indicates that the raised anomaly is not associated with either a new anomalous operating mode or a new normal operating mode, incorporating the received data point into an existing cluster; and
   based at least in part on determining that the received data point belongs to one of the second one or more clusters, alerting a user to one of a predicted need for maintenance associated with the machine or a predicted failure of the machine.

2. The computer-implemented method of claim 1, wherein the request includes at least one or more of: an identifier of a location of an initial labeled data set to be used to generate clusters, an identifier of a location of testing data to test a clustering algorithm or model associated with the machine health anomaly detection; actual initial labeled data and/or testing data; an identifier of the clustering algorithm or model to be used; an identifier of a location to store a cluster history; an identifier of a location to store clusters; one or more identifiers of users allowed to provide feedback; identifiers of execution and memory resources, or types of resources, to use for clustering; an identifier of what criteria to use to estimate a number of clusters to initialize and how to perform the initialization; and/or one or more identifiers of users allowed to receive anomaly data.

3. The computer-implemented method of claim 1, further comprising: updating a cluster in response to the received user feedback.

4. A computer-implemented method comprising:
   receiving a request to perform machine health anomaly detection for a machine using a plurality of clusters;
   performing the requested machine health anomaly detection, the performing comprising:
      receiving a data point, and
      determining when the received data point is a part of one of the plurality of clusters utilizing a distance to centers of the plurality of clusters, wherein the determining comprises:
         when the received data point is determined to belong to a cluster associated with a normal operating mode of the machine, assigning the received data point to the determined cluster, updating the cluster, and updating a history for the cluster,
         when the received data point is determined to belong to a cluster associated with an anomalous operating mode of the machine, raising an anomaly, updating the cluster, and updating a history for the cluster, and
         when the received data point is determined to not belong to any existing cluster, creating a new cluster associated with the received data point, raising an anomaly, and, based at least in part on user feedback related to the raised anomaly, identifying the received data point as being associated with one of a new anomalous operating mode of the machine or a new normal operating mode of the machine, or, if the user feedback indicates that the raised anomaly is not associated with either a new anomalous operating mode or a new normal operating mode, incorporating the received data point into an existing cluster; and
   based at least in part on determining that the received data point belongs to a cluster associated with an anomalous operating mode of the machine, alerting a user to one of a predicted need for maintenance associated with the machine or a predicted failure of the machine.

5. The computer-implemented method of claim 4, wherein the request includes at least one or more of: an identifier of a location of an initial labeled data set to be used to generate clusters, an identifier of a location of testing data to test a clustering algorithm or model associated with the machine health anomaly detection; actual initial labeled data and/or testing data; an identifier of the clustering algorithm or model to be used; an identifier of a location to store a cluster history; an identifier of a location to store clusters; one or more identifiers of users allowed to provide feedback; identifiers of execution and memory resources, or types of resources, to use for clustering; an identifier of what criteria to use to estimate a number of clusters to initialize and how to perform the initialization; and/or one or more identifiers of users allowed to receive anomaly data.

6. The computer-implemented method of claim 4, wherein when the cluster is updated, a mean and covariance of the cluster are updated.

7. The computer-implemented method of claim 4, further comprising:
receiving user feedback about a false positive; and
resetting a label of the determined cluster in response to the feedback.

8. The computer-implemented method of claim 4, further comprising:
receiving user feedback about a false negative; and
retraining a clustering algorithm used to initialize the determined cluster.

9. The computer-implemented method of claim 4, further comprising:
initializing the plurality of clusters in an ad-hoc manner.

10. The computer-implemented method of claim 4, further comprising:
determining a number of clusters to initialize using an initialization criteria; and
initializing the number of clusters as the plurality of clusters.

11. The computer-implemented method of claim 4, further comprising:
maintaining a history for metadata regarding usage of each cluster.

12. The computer-implemented method of claim 11, further comprising:
detecting drift of the cluster based at least in part on the maintained history; and
raising an alert based on the detected drift of the cluster.

13. The computer-implemented method of claim 4, wherein the received data point is produced by a sensor of the machine.

14. A system comprising:
a first one or more electronic devices managed by a cluster-based machine health anomaly detection service in a multi-tenant provider network; and
a second one or more electronic devices implementing the cluster-based machine health anomaly detection service in the multi-tenant provider network, the cluster-based machine health anomaly detection service including instructions that upon execution cause the cluster-based machine health anomaly detection service to:
receive a request to perform machine health anomaly detection for the first one or more electronic devices using a plurality of clusters,
perform the machine health anomaly detection, wherein to perform the machine health anomaly detection further comprises instructions that upon execution cause the cluster-based machine health anomaly detection service to:
receive a data point from one of the first one or more electronic devices; and
determine when the received data point is a part of one of the plurality of clusters utilizing a distance to centers of the one or more clusters, wherein to determine comprises:
when the received data point is determined to belong to a cluster associated with a normal operating mode of the first one or more electronic devices, assigning the received data point to the determined cluster, updating the cluster, and updating a history for the cluster, when the received data point is determined to belong to a cluster associated with an anomalous operating mode of the first one or more electronic devices, raising an anomaly, updating the cluster, and updating a history for the cluster, and when the received data point is determined to not belong to any existing cluster, creating a new cluster associated with the received data point, raising an anomaly, and, based at least in part on user feedback related to the raised anomaly, identifying the received data point as being associated with one of a new anomalous operating mode of the machine or a new normal operating mode of the machine, or if the user feedback indicates that the raised anomaly is not associated with either a new anomalous operating mode or a new normal operating mode, incorporating the received data point into an existing cluster, and based at least in part on determining that the received data point belongs to a cluster associated with an anomalous operating mode of the first one or more electronic devices, alert a user to one of a predicted need for maintenance associated with the first one or more electronic devices or a predicted failure of the first one or more electronic devices.

15. The system of claim 14, wherein the request includes at least one or more of: an identifier of a location of an initial labeled data set to be used to generate clusters, an identifier of a location of testing data to test a clustering algorithm or model associated with the cluster-based machine health anomaly detection; actual initial labeled data and/or testing data; an identifier of the clustering algorithm or model to be used; an identifier of a location to store a cluster history; an identifier of a location to store clusters; one or more identifiers of users allowed to provide feedback; identifiers of execution and memory resources, or types of resources, to use for clustering; an identifier of what criteria to use to estimate a number of clusters to initialize and how to perform the initialization; and/or one or more identifiers of users allowed to receive anomaly data.

16. The system of claim 14, wherein when the cluster is updated, a mean and covariance of the cluster are updated.

17. The system of claim 14, wherein the cluster-based anomaly detection service includes further instructions that upon execution cause the cluster-based machine health anomaly detection service to:
receive user feedback about a false positive; and
reset a label of the determined cluster in response to the feedback.

18. The system of claim 14, wherein the cluster-based anomaly detection service includes further instructions that upon execution cause the cluster-based machine health anomaly detection service to:
receive user feedback about a false negative; and
retrain a clustering algorithm used to initialize the determined cluster.

19. The system of claim 14, wherein the cluster-based anomaly detection service includes further instructions that upon execution cause the cluster-based machine health anomaly detection service to:
detect a drift based at least in part on the history maintained for the cluster; and
raise an alert.

20. The computer-implemented method of claim 4 further comprising:
    based at least in part on determining that the received data point belongs to a cluster associated with an anomalous operating mode of the machine, generating an estimated failure time of the machine.

\* \* \* \* \*